United States Patent [19]
Lafforthun

[11] Patent Number: 5,341,592
[45] Date of Patent: Aug. 30, 1994

[54] BAT ELIMINATION AND CONTAINMENT DEVICE

[76] Inventor: David Lafforthun, 1383 West Galway Rd., Galway, N.Y. 12074

[21] Appl. No.: 64,819

[22] Filed: May 19, 1993

[51] Int. Cl.⁵ ..................... A01K 69/06; A01M 23/00
[52] U.S. Cl. ........................................................ 43/66
[58] Field of Search ................ 43/66, 64, 65; 160/12, 160/13, 14, 15, 16, 17; 52/101

[56] References Cited

U.S. PATENT DOCUMENTS

| | | | |
|---|---|---|---|
| 729,786 | 6/1903 | McDaniel | 43/66 |
| 1,029,053 | 6/1912 | Evans | 43/65 |
| 1,506,045 | 8/1924 | Boyer | 43/65 |
| 1,586,630 | 6/1926 | Lee et al. | 43/65 |
| 1,797,743 | 3/1931 | Wesson | 43/65 |
| 2,741,066 | 3/1956 | Conway | 43/121 |
| 3,885,341 | 5/1975 | Kuchenbecker et al. | 43/65 |
| 3,990,173 | 11/1976 | Barone | 43/77 |
| 4,214,399 | 7/1980 | Bradley | 43/66 |
| 4,669,237 | 6/1987 | Constantine | 52/101 |
| 4,757,638 | 7/1988 | Lafforthun | 43/66 |
| 4,905,628 | 3/1990 | Williams et al. | 119/21 |
| 5,175,958 | 1/1993 | Wedemeyer | 43/121 |

*Primary Examiner*—P. Austin Bradley
*Assistant Examiner*—Chuck Y. Mah
*Attorney, Agent, or Firm*—Heslin & Rothenberg

[57] ABSTRACT

A bat elimination and containment device is provided which facilitates the capture and controlled release of bats from a structure. The main components of the device include a containment housing which is connected to an opening to the interior of a structure by a corrugated entry passage. A movable door seals an exit way of the housing, which encloses a roosting means for bats captured within the housing. Bats follow air currents from the structure through the corrugated entry passage and into the housing, from which they are unable to easily escape. Once so contained, they roost within the housing until they are controllably released via the opening of the door sealing the exit way of the housing.

19 Claims, 3 Drawing Sheets

BAT ELIMINATION AND CONTAINMENT DEVICE

FIELD OF THE INVENTION

The invention relates in general to a bat elimination and containment device, and more particularly to a device which effects the exit of bats from the interior of a structure, while preventing reentry thereto, and which contains the bats which exit from the interior of the structure for controlled release thereof.

BACKGROUND OF THE INVENTION

Of the numerous vermin taken to inhabiting buildings and other structures, few disturb homeowners as intensely as do bats. Since bats tend to live in colonies, one structure may house several hundred of them. Considering that bats are often carriers of rabies, this can present quite a substantial health hazard. The fact that bat guano (droppings) makes excellent fertilizer is usually of little consolation to the homeowner plagued with a sizable colony in the attic. Lastly, and most importantly, of the hundreds of varieties of animals known to man, few instill as much fear in both young and old as do bats. Those time worn tales portraying bats as blood-sucking creatures fond of entangling themselves in women's hair have resulted in the use of many largely useless remedies such as moth balls and the burning of sulfur candles. In fact, some desperate individuals have resorted to the use of dangerous pesticides such as hydrogen cyanide in order to rid themselves of the pest.

In recent years intricate traps have also been devised to exterminate bats within a structure (see, e.g., U.S. Pat. No. 3,990,173). However, such traps tend to be inhumane, require removal of corpses following extermination, and are all but useless in preventing new bats from subsequently entering and remaining within the structure. Other more humane traps (see, e.g., U.S. Pat. No. 4,757,638) prevent a bat from subsequently entering a structure through a familiar opening, through the use of a one-way exit door. The bat, however, is released in the immediate vicinity of the structure from which it is removed.

Consequently, a need continues to exist for a humane bat elimination device which is both safe and effective and which permanently eliminates bats from a structure while keeping new ones from inhabiting the same building. The bat elimination device should also provide for containment of the bats for controlled release in a chosen location.

SUMMARY OF THE INVENTION

This need is met, and problems of prior bat traps overcome, by the bat elimination and containment device according to the subject invention.

The main components of the device of the subject invention include a containment housing, a tubular-shaped radially corrugated entry passage, a movable closure means, and a roosting means. The entry passage has one end secured to an entry way of the housing and its other end mounted to an opening to the interior of a structure from which bats are to be eliminated. The bats move through the corrugated entry passage and pass into the housing, which, in one embodiment, is divided into two chambers by an interior wall having an aperture therein. The bats pass through a vertical tubular member in the first chamber which directs them to the aperture in the interior wall leading to the second chamber. Within the second chamber, a roosting means is provided for the bats. Such a roosting means can be made of any suitable material, such as wire mesh or screening, or wood with apertures therein (i.e. formed to resemble a beehive).

In another embodiment, the bats may pass from the entry passage directly into the vertical tubular member and into the containment housing.

The bats are prevented from returning to the structure by each of the interior wall and the tubular member. Each of these components is constructed to hamper the bats' return to the structure from which they came. Thus, the bats roost within the housing until they are released in a suitable environment. The release is accomplished by removing or opening the door which seals the exit way of the housing. The roosting means can be mounted directly to the door so that the door's removal or opening also removes the roosting means. Once the housing door is opened or removed, the bats can escape. This controlled release of the bats allows them to be taken away from the structure which they inhabit to a more desirable location for release.

Each of the housing and the door have apertures therein to allow a constant flow of air through the entire device from the environment to the interior of the structure. This flow of air facilitates entry of bats into the entry passage, since bats often follow scents carried by air currents. The placement of the bat trap along a scent trail causes the bats, who are following the scented air flow, to enter the corrugated entry passage and therefore end up contained within the trap and containment device.

Accordingly, one object of the present invention is the provision of an effective bat elimination device which operates in accordance with a bat's flying habits.

Another object of the present invention is to provide a means for bat elimination which will not only rid a structure of bats, but will prevent subsequent reentry to a structure through a familiar opening by new bats.

A further object of the invention is the provision of a humane means and method for removing bats from a structure which is also safe, sanitary and requires little or no contact with the bats themselves.

An even further object of the invention is the provision of an inexpensive elimination device which is also easily installed, adaptable to any given structure, and requires little or no maintenance.

An additional object of the invention is the provision of a means for containing any bats removed from a structure so that they can be transported to a desired location for controlled release.

BRIEF DESCRIPTION OF THE FIGURES

These and other objects, features and advantages of this invention will be evident from the following detailed description of preferred embodiments when read in conjunction with the accompanying drawings in which.

DETAILED DESCRIPTION OF THE INVENTION

Figure 1:
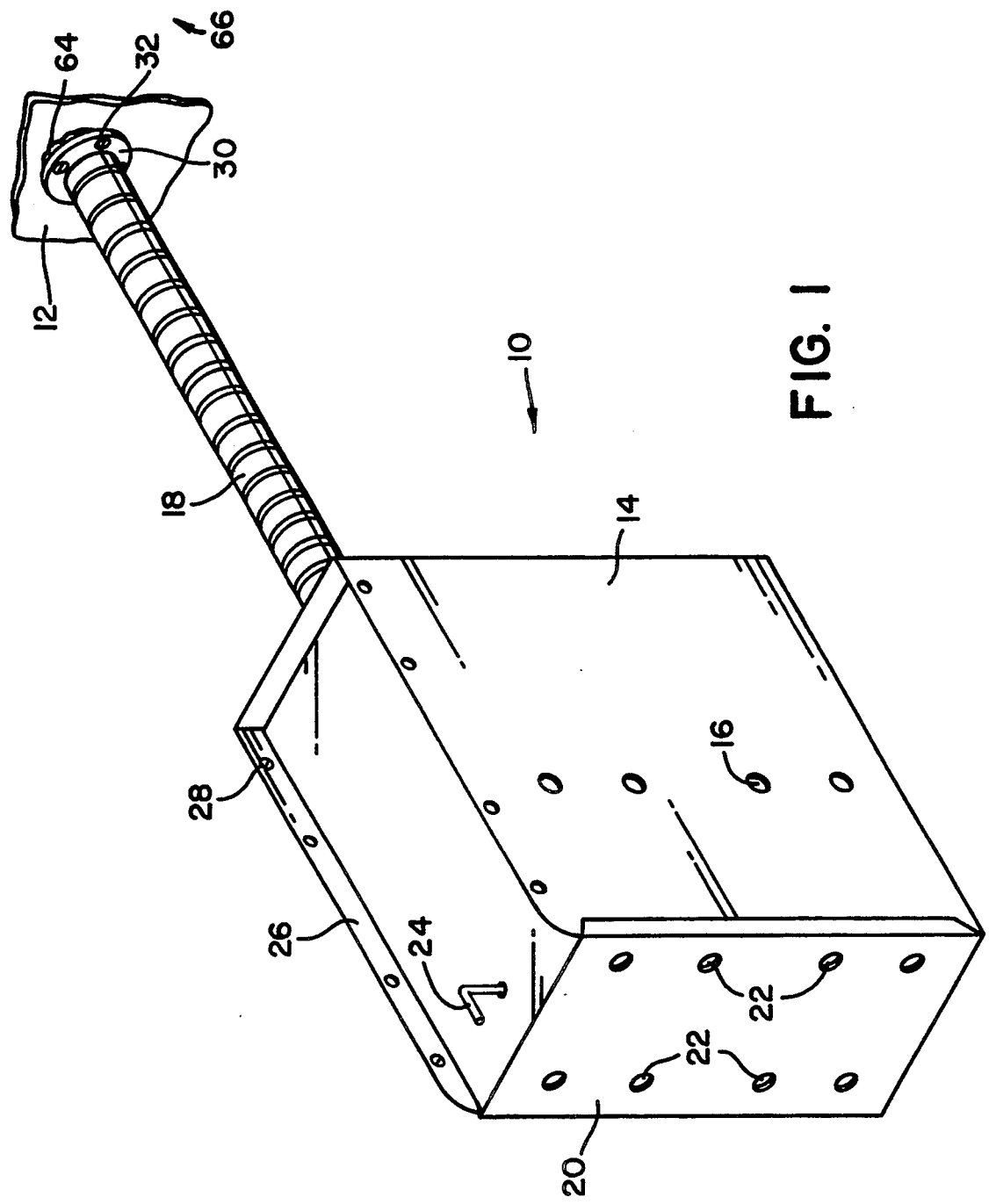
FIG. 1 is an isometric view of one embodiment of the bat elimination and containment device according to the subject invention affixed to a structure over an opening through which bats enter and exit the structure.
Figure 2:
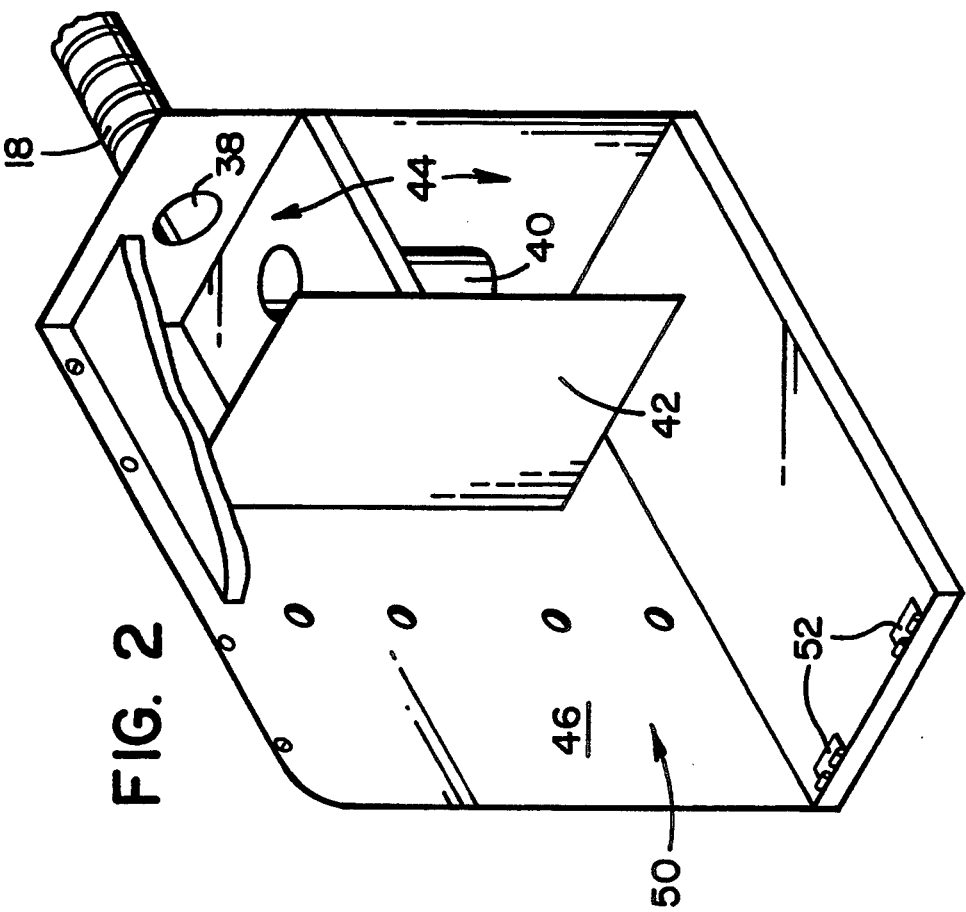
FIG. 2 is a partially-cut away isometric view of another embodiment of the bat elimination and containment device of the subject invention, showing the interior features of the device.
Figure 3:
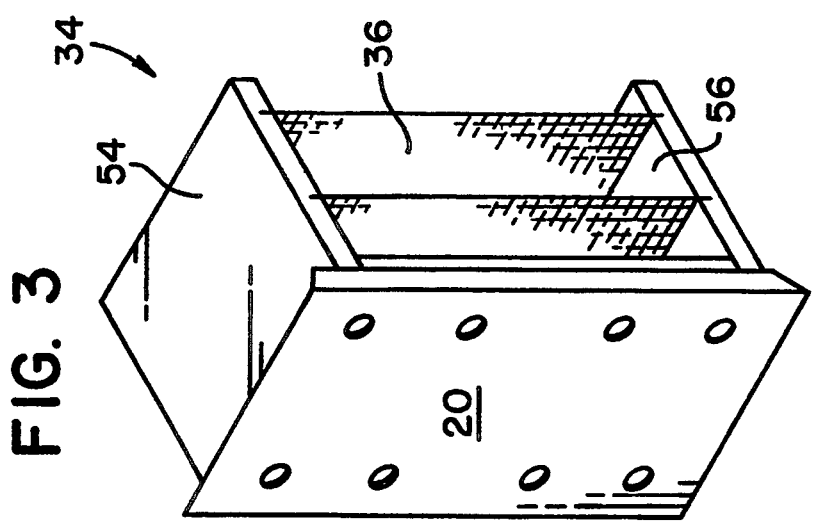
FIG. 3 is an isometric view of the combined exit door and roost of the bat elimination and containment device shown in FIG. 1.

The main components of preferred embodiments of the subject invention are depicted in FIGS. 1–3.

Referring to FIG. 1, the bat elimination and containment device 10 comprises a containment housing 14 which is mounted to a structure 12 by a flexible, corrugated entry passage 18. One end 60 (see FIG. 4) of the corrugated entry passage 18 is mounted to the structure 12 using any suitable means. As shown by way of example, a mounting flange 30 is connected to the end 60 of the corrugated entry passage 18 and mounted to the structure 12 using screws 32. The mounting flange 30 has a substantially flat base surface for engaging the structure adjacent the structural opening. The end 60 of the corrugated entry passage 18 and the mounting flange 30 substantially cover an opening 64 in the structure 12 through which bats enter and exit the interior 66 of the structure 12. The other end 58 (see FIG. 4) of the corrugated entry passage 18 is secured to the housing 14 at the entry way 38 (see FIG. 2) thereof. The corrugated entry passage 18 is composed of a tube which is of sufficient size for a bat to fly or crawl through with relative ease, and the radial corrugation 68 provides the flexibility so that the entry passage 18 can be positioned at any desired angle relative to structural opening 64. This allows for horizontal positioning of the entire device so that the tubular member 40 is vertically positioned so as to prevent bats from returning therethrough.

Referring to FIG. 2, the entry way 38 opens into a first interior compartment 44 of the housing 14. This first interior compartment 44 is separated from a second interior compartment 46 by an interior wall 42. As shown best in FIGS. 2 and 4, the interior wall 42 does not extend fully to the bottom of the housing, leaving an aperture 62 between the two interior compartments 44 and 46. Also located within the first interior compartment 44 is a vertical tubular member 40 which directs bats toward the aperture 62 by locating one end of the tubular member 40 near the entry way 38 and the other end of the tubular member 40 near the aperture 62. It should be readily apparent that the configuration of the interior of the housing can be varied. For example, it is not necessary to have an interior wall and separate compartments. The entry passage may open directly into the vertical tubular member which then directs bats into the housing. As long as the tubular member is vertically positioned, bats will be prevented from returning to the structure from which they came.

Referring again to FIG. 2, the second interior compartment 46 is open at one end due to the exit way 50 of the housing 14. This exit way 50 is closed by a door 20, as shown in FIG. 1. The door may be removable or hinged (see hinges 52 in FIG. 2).

Included within the second interior compartment is a roosting means 34 (see FIG. 3). This roosting means 34 comprises an upper frame 54 and a lower frame 56, between which suitable material for roosting 36 is placed. As shown, the roosting material 36 comprises wire mesh. Screen material or wood with apertures therein (to form a beehive form) would also be suitable, and any other materials which enable a bat to roost thereon. As shown in FIG. 3, the door 20 is attached to the roosting means 34 so that removal of the door 20 removes the roosting means 34 from the second interior compartment 46.

Each of the door 20 and the housing 14 are provided with vents, 22 and 16 respectively. These vents can be apertures of a size suitable to contain bats within the housing, or the apertures can be covered by screen material if the apertures are too large to prevent bats from escaping. These vents provide for a flow of air from the environment through the device and into the interior of the structure. As discussed above, such an air flow is necessary for the bats to follow familiar scent trails so they will be lead into the trap device. Air current flowing through the device alerts bats within the structure 12 of the continued existence of an exit passageway. As bats prefer to use familiar exit and entrance passageways, this feature corresponds to the bats' instinctive habits.

For ease in mounting the device to a structure, the housing 14 can also be provided with a mounting flange 26 and be mounted to the structure using screws 28 (see FIG. 1). The mounting flange 26 has a substantially flat side surface for engaging the structure in a suitable location.

Figure 4:
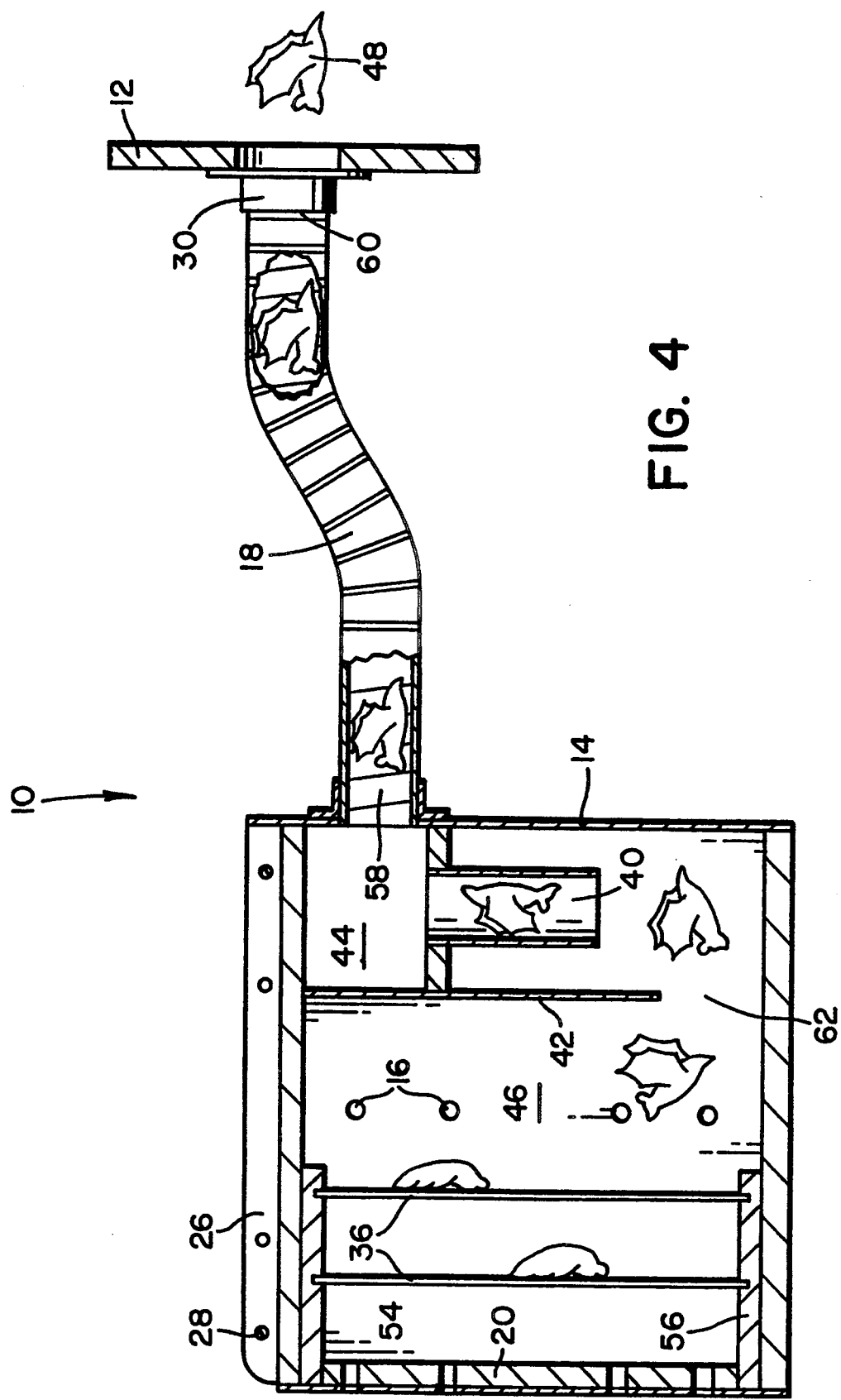
FIG. 4 is a partially cut-away side elevational view of the bat elimination and containment device shown in FIG. 1, showing the path of travel and containment of the bats.

Referring now to FIG. 4, device 10 is shown in operation. Bats 48 leaving structure 12 to feed will be alerted to the continued existence of an exit passageway by the constant air current maintained by the vents 22 and 16 of the door and housing, respectively. The bat may then enter device 10 through the first end 60 of the corrugated entry passage 18. Upon entering the first interior chamber 44 of the housing 14, the bat continues to follow the scent trail carried by the air flow. To do this, the bat must fly through the tubular member 40 which, like the corrugated entry passage 18, is of sufficient size for a bat to fly or crawl through with relative ease.

The bat then continues to follow the scented air flow by flying or crawling through the aperture 62 formed in interior wall 42, ending up in the second interior chamber 46. Here the roosting means 36, such as wire mesh or screening, is located between the upper and lower frames 54 and 56, respectively. Unable to escape from the housing 14 due to the door 20 closing the exit way, the bat roosts within the housing.

The bat is prevented from escaping from the housing by two elements of the device. First, the aperture 62 formed by the interior wall 42 is located at the bottom of the wall. The bats' tendency is to look for an avenue of escape in an upward direction, therefore it is difficult for the bat to locate this aperture 62. Second, it is also difficult for a bat to locate the bottom opening of the tubular member 40 for the same reason, since they will try to escape toward the upper part of the tubular member 40 which is sealed off. As a further deterrent to escape, the interior of the vertical tubular member 40 is smooth so as to prevent the movement of a bat in the upward direction therein. The combination of all of these factors helps to prevent bats from returning to the structure from the trap, and leads to their containment within the housing and generally within the second interior compartment on the roosting means.

Once all bats have left structure 12, device 10 may be removed from structural opening 66 and opening 66 may be permanently sealed.

When and where desired, bats so eliminated from the structure and contained within the housing can be controllably released. This is accomplished by opening the door 20 to reveal the exit way 50 of the housing. It may also be desirable to remove the entire roosting means 34 (such as where the roosting means 34 is connected to the door 30 as shown in FIG. 3) to facilitate release of the bats. Where necessary, the empty device can be reattached at the opening 66 to collect more bats from the structure 10, repeating the operation described above.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A device for eliminating bats from the interior of a structure having a structural opening through which said bats enter and exit said interior, and containing said eliminated bats, said device comprising:
    a containment housing having an entry way and an exit way, said housing divided into a first chamber and a second chamber by an interior wall, said first chamber connected to said second chamber by an aperture in said interior wall;
    a tubular-shaped radially corrugated entry passage having a first end and a second end, said first end being mountable to said structure such that it substantially covers said structural opening and allows said bats occupying the interior of said structure to enter said housing, and said second end of said entry passage being secured to said entry way of said housing and providing entry to said housing;
    a movable closure means sealing said exit way of said housing; and
    roosting means positioned within said housing.

2. A device for eliminating bats from the interior of a structure having a structural opening through which said bats enter and exit said interior, and containing said eliminated bats, said device comprising:
    a containment housing having an entry way and an exit way;
    a tubular-shaped radially corrugated entry passage having a first end and a second end, said first end being mountable to said structure such that it substantially covers said structural opening and allows said bats occupying the interior of said structure to enter said housing, and said second end of said entry passage being secured to said entry way of said housing and providing entry to said housing;
    a vertically positioned member within said housing, wherein the position of said member requires that bats entering the housing pass through said member prior to reaching said exit way of said housing;
    a movable closure means sealing said exit way of said housing; and
    roosting means positioned within said housing.

3. The device of claim 1 or 2 wherein said housing includes vents to allow air flow therethrough.

4. The device of claim 3 wherein said vents comprise apertures in said housing.

5. The device of claim 4 wherein said apertures are covered by screens.

6. The device of claim 1 or 2 wherein said entry way and said exit way comprise apertures in said housing.

7. The device of claim 1 or 2 wherein said tubular-shaped radially corrugated entry passage is flexible.

8. The device of claim 1 or 2 wherein said movable closure means comprises a removable door.

9. The device of claim 1 or 2 wherein said movable closure means comprises a hinged door.

10. The device of claim 1 or 2 wherein said movable closure means is vented.

11. The device of claim 1 or 2 wherein said roosting means comprises wire mesh.

12. The device of claim 1 or 2 wherein said roosting means comprises wood having apertures therein.

13. The device of claim 1 or 2 wherein said roosting means is mounted to said movable closure means.

14. The device of claim 1 or 2 wherein said roosting means is removable.

15. The device of claim 1 or 2 further comprising a first mounting flange secured to said first end of said radially corrugated entry passage, said first mounting flange having a substantially flat base surface for engaging said structure adjacent said structural opening.

16. The device of claim 1 or 2 further comprising a second mounting flange secured to said housing, said second mounting flange having a substantially flat side surface for engaging said structure.

17. The device of claim 2 wherein said housing is divided into a first chamber and a second chamber by an interior wall, said first chamber connected to said second chamber by an aperture in said interior wall.

18. The device of claim 17 wherein said roosting means is contained within said second chamber and said entry way enters into said first chamber.

19. The device of claim 1 further comprising a tubular member within said first chamber through which said bats must travel to reach said aperture in said interior wall.

* * * * *